Oct. 3, 1933.        G. W. CARLSON        1,928,684
FOUR-WHEEL DRIVE
Filed Sept. 12, 1930        3 Sheets-Sheet 1
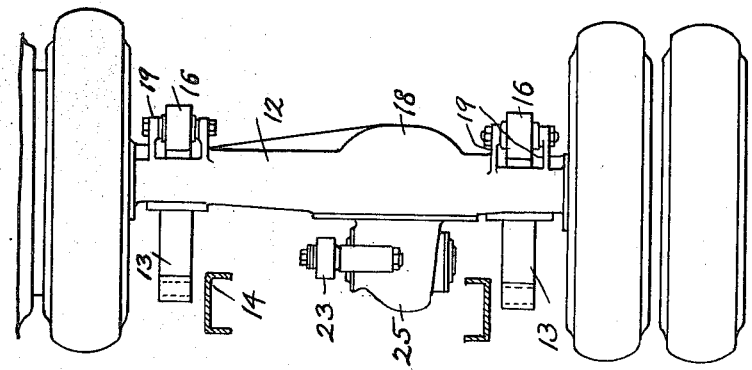
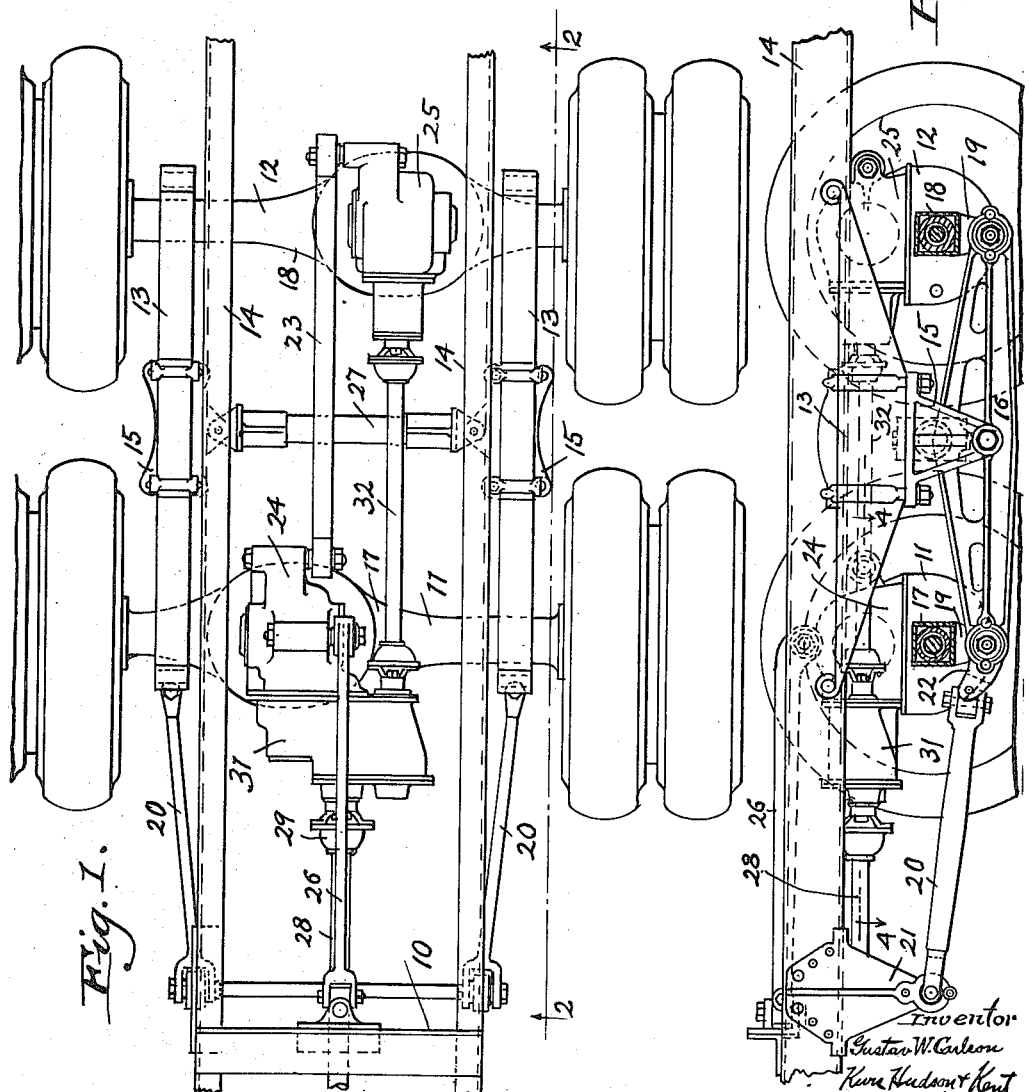

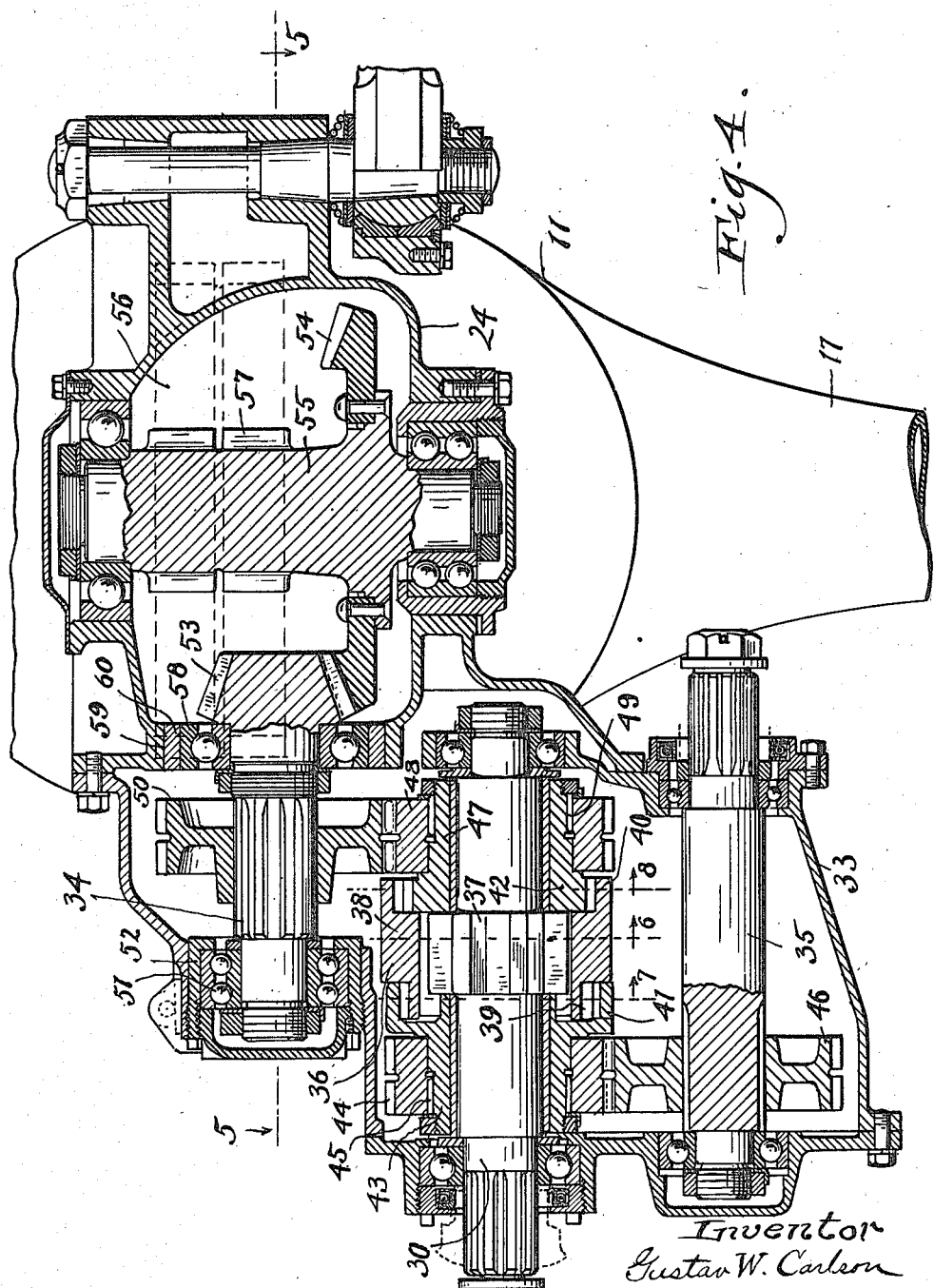

Oct. 3, 1933. G. W. CARLSON 1,928,684
FOUR-WHEEL DRIVE
Filed Sept. 12, 1930 3 Sheets-Sheet 3
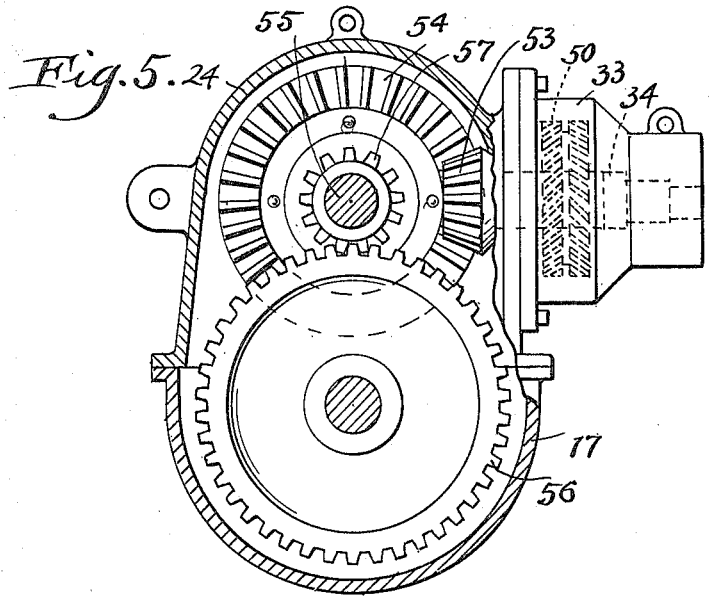
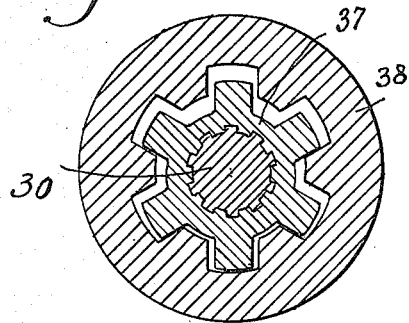
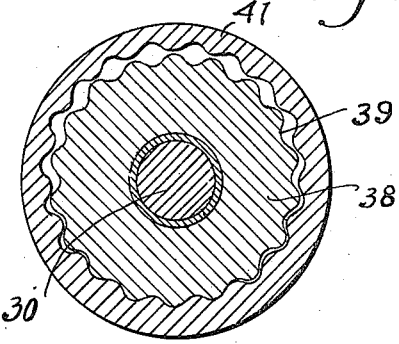
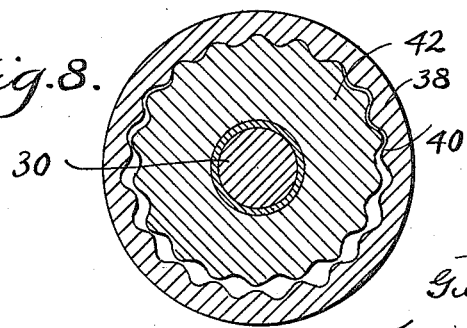

Patented Oct. 3, 1933

1,928,684

UNITED STATES PATENT OFFICE 1,928,684

FOUR-WHEEL DRIVE

Gustav W. Carlson, Cleveland, Ohio, assignor to Eaton Manufacturing Company, Cleveland, Ohio, a corporation of Ohio Application September 12, 1930
Serial No. 481,422

12 Claims. (Cl. 180—22)

This invention relates to motor vehicles of the type having two rear driving axles arranged in tandem as disclosed in U. S. Patent No. 1,658,164 issued February 7, 1928, in the name of Magnus Hendrickson, and as its principal object, aims to provide novel means for distributing power to the driving axles.

Another object of this invention is to provide a novel arrangement for the driving axles of motor vehicles of the type mentioned, in which the means for dividing the power between the two driving axles is mounted on one of those axles.

A further object of this invention is to provide a novel arrangement for the driving axles of motor vehicles of the type mentioned, in which the means for dividing the power between the two driving axles is mounted on the forward axle, and in which the means for transmitting power from the dividing means to the rear driving axle, extends across the housing of the forward axle in vertically spaced relation with respect to the axis of the housing of the forward axle.

Other objects and advantages of the invention will be apparent from the following description, when taken in conjunction with the accompanying sheets of drawings in which Fig. 1 is a top plan view of a portion of a chassis of a motor vehicle showing the general arrangement of the driving axles and power distributing means.

Fig. 2 is a side elevational view thereof taken in the direction indicated by line 2—2 of Fig. 1.

Fig. 3 is a rear end elevational view thereof.

Fig. 4 is a sectional plan view taken through the power dividing unit and through a portion of the forward axle substantially on the plane indicated by the line 4—4 of Fig. 2.

Fig. 5 is a sectional elevation taken through the forward axle substantially on the line 5—5 of Fig. 4.

Fig. 6 is a sectional elevation taken on the line 6—6 through a part of the differential mechanism of Fig. 4.

Fig. 7 is a similar sectional elevation taken on line 7—7 of Fig. 4, and

Fig. 8 is a similar sectional elevation taken on line 8—8 of Fig. 4.

In illustrating my invention, I have shown a portion of the chassis 10 of a motor vehicle having two rear driving axles 11 and 12, which are arranged in tandem, and although in disclosing my invention I have referred particularly to tandem driving axles coupled to each other and to the other parts of the vehicle by linkage of the type shown in the above mentioned patent, it should be understood however that my invention is not necessarily limited to use with this particular linkage.

As shown in Figs. 1, 2 and 3 of the drawings the main leaf springs 13 which support the vehicle body and the load carried thereby, are arranged outwardly of the frame members 14 with their ends secured thereto in any propriate manner. Intermediate their ends the springs rest upon and are secured to brackets 15 which, in turn, are pivoted to the central portion of the load bars 16 which they are arranged to straddle. These load bars extend between the housings 17 and 18 of the forward and rear axles, respectively, and are pivotally connected to brackets 19 which depend from the underside of each axle housing near the ends thereof. It will be seen from this arrangement that the load represented by the vehicle body is transmitted to the axle housings through the load bars and is supported by the axle housings at points entirely below these members.

The load bars 16 connect the driving axles together so that they form a driving unit from which power is transmitted to the vehicle frame by means of the radius rods 20. These rods are arranged with their forward ends pivotally connected to the brackets 21 which extend downwardly from the frame members 14, and with their rear ends connected to the forwardly extending arms 22 of the load bars. Relative tilting movement between the forward and rear axles of the unit is prevented by means of the torque rod 23 which is arranged near the longitudinal center line of the vehicle with its forward end connected to the gear carrier 24 of the forward axle, and with its rear end connected to the gear carrier 25 of the rearward axle. In a similar manner relative tilting movement between the axles and the vehicle frame is prevented by the torque rod 26, which is arranged substantially on the central line of the vehicle, and has the rear end thereof connected to the gear carrier of the forward axle and has its forward end connected to the vehicle frame. Relative tilting movement between the spring brackets 15 is prevented by means of the transverse tie bar 27 which is arranged with its opposite ends pivotally connected to these brackets.

As already stated, the tandem driving axles form a driving unit to which power is supplied from the motor of the vehicle by means of the propeller shaft 28. As indicated in Figs. 1 and 2 of the drawings, this propeller shaft lies in a substantially horizontal plane, and extends rearwardly substantially on the center line of the vehicle. At the rearward end of this propeller shaft I provide a universal joint 29 which is connected to the forward end of the drive shaft 30 of the power dividing unit 31. This power dividing unit which will be described more in detail hereinafter is secured directly to the gear carrier of the forward axle.

It will be noted that the axles of the driving unit are double reduction axles of the type commonly known as the "knee type", that is to say, these axles are of the type in which the axes of the pinion shaft and of the counter shaft lie in a plane which extends substantially horizontally above the axle housing. By employing axles of this type the power dividing unit 31 is supported at a height which will permit power to be delivered to the rear axle by means of a shaft 32 arranged to extend over the housing of the forward axle. It should also be noted that the forward and rear axles are not constructed with the gear carriers thereof on the longitudinal center line of the vehicle, but are constructed so that the gear carrier of the forward axle is on one side of the vehicle center line, and the gear carrier of the rear axle is on the other side of the vehicle center line. By this arrangement the pinion shaft of the rear axle is properly located for connection with the shaft 32. Both rear axles are substantially the same in construction and may be interchanged by turning them end from end.

The power dividing unit, which I have already stated is secured directly to the gear carrier 24 of the forward axle 11, comprises a casing 33, which houses the pinion shaft 34 for the forward axle and the power shaft 35 for the rear axle, as well as differential mechanism designated generally as 36, which is arranged intermediate the shafts. The differential mechanism which I prefer to employ is of a type now commercially available and known as the Krohn differential. Since this differential mechanism is well known in the art, a detailed description thereof is not necessary here, and it is deemed sufficient, in connection with the disclosure of my invention, to describe but briefly the construction and arrangement of the parts. As indicated in Figs. 4 and 6 this mechanism includes a driving member 37 which is secured to or may be formed integral with the drive shaft 30. This member is substantially star-shaped having radially extending teeth or lugs which loosely engage between the correspondingly arranged teeth of the combination gear member 38, as clearly shown in Fig. 6 of the drawings. At its forward end the combination gear member is formed with an external annular gear portion 39 and at its rear end is formed with an internal ring gear portion 40. The gear portion 39 at the forward end of the combination gear extends within the ring gear portion of the internal gear member 41, while the ring gear portion at the rear end of the combination gear surrounds the gear portion of the external gear member 42. In this arrangement the ring gear portion of the internal gear member 41 has one more tooth than the annular gear portion 39 of the combination gear, and likewise the ring gear portion 40 of the combination gear has one more tooth than the gear portion of the external gear member 42. The combination gear member, as indicated in Fig. 6 of the drawings, is not confined to rotate about a fixed axis, but because of the loose connection between this member and the teeth of the driving member 37, is free to float so that it may find its own axis of rotation in accordance with different operating conditions. As power is delivered to the drive shaft 30 from the motor of the vehicle by means of the propeller shaft 28, rotation of the drive member 37 causes rotation of the combination gear 38 which, in turn, imparts rotation to the internal and external gear members 41 and 42, in accordance with the resistance which these members offer to the turning of the combination gear in response to different operating conditions encountered by the wheels of the respective axles.

The internal gear member 41, which is driven from the forward end of the combination gear 38, has a hub portion 43 rotatably mounted upon the drive shaft 30. A herring-bone gear 44 is secured to this hub portion as by means of the key 45, and meshes with a herring-bone gear 46 splined upon the power shaft 35. Likewise, the external gear member 42 is formed with a hub portion 47 which is rotatably mounted upon the drive shaft 30, and is provided with a herring-bone gear 48, which is secured to the hub portion as by means of the key 49. The herring-bone gear 48 meshes with the herring-bone gear 50 which is splined to the pinion shaft 34. It will be seen from this arrangement that the power which is supplied to the differential mechanism is divided up between the internal and external gear members 41 and 42 in accordance with the requirements of the respective axles, and that the power allotted to the internal gear member 41 is transmitted through the herring-bone gears 44 and 46 to the shaft 35 from which it is delivered to the pinion shaft of the rear axle through the shaft 32, and that the power allotted to the external gear member 42 is transmitted to the pinion shaft 34 of the forward axle by means of the herring-bone gears 48 and 50.

It should be noted that, as already stated, the herring-bone gears 46 and 50 are splined to the shafts 35 and 34, respectively. These sliding connections allow the herring-bone gears 46 and 50 to move axially of their shafts and to locate themselves for most efficient cooperation with the herring-bone gears 44 and 48 of the differential mechanism. By connecting the herring-bone gears to their shafts in this manner, axial adjustment of the respective shafts need not be extremely accurate since the herring-bone gears will properly locate themselves during operation of the vehicle. In connection with the pinion shaft 34 for the forward axle it should be noted that the forward end of this shaft is mounted in the bearing 51, which is carried by the sleeve 52. This sleeve is threaded into an opening of the casing of the power dividing unit and by rotation thereof the shaft 34 can be adjusted axially independently of the herring bone gear 50. In other words, the shaft 34 can be adjusted axially so that the pinion 53 at its inner end will cooperate most efficiently with the ring gear 54 of the counter shaft 55, without requiring special attention to, or adjustment of, the herring-bone gear 50, since this gear will adjust itself to proper position.

It will now be readily seen from the foregoing description that the power supply to the dividing unit will be efficiently distributed to the axles of the driving unit, the power for the rear axle being transmitted through the shaft 32 which passes over the housing of the forward axle, and the power for the forward axle being supplied to the herring-bone ring gear 56 of the differential unit of that axle by means of the pinion shaft 34, the bevel pinion 53, the bevel gear 54, the counter shaft 55 and the herring-bone gear 57 of the counter shaft.

It should also be noted that the power dividing mechanism which is supported by the gear carrier of the forward axle is adapted to be removed therefrom as a unit. In other words, when repairs are necessary to the axle or to the power dividing unit, the latter may be readily dismounted from the gear carrier of the axle. It should also be noted that the power dividing unit has been so designed that the pinion shaft 34 housed therein, forms a part of the dividing unit and is removable from the forward axle with this unit. To permit the pinion 53, and the bearing 58 for the rear end of the pinion shaft, to be removed through the opening 59 of the gear carrier of the forward axle, I have constructed the gear carrier so that the opening 59 will have a diameter somewhat greater than the maximum diameter of the largest size pinion which might be used in the axle. To support the bearing 58 in this enlarged opening of the gear carrier, I provide the adapter or filler ring 60 which forms a seat for the bearing 58, and which can be readily mounted or dismounted when a pinion of large size is installed or removed.

It will now be readily understood that I have provided a novel arrangement for distributing power to tandem driving axles in which the power dividing unit is mounted directly upon the forward axle in such position that power can be readily supplied thereto from the motor of the vehicle, and so that power can be efficiently distributed therefrom to the respective driving axles. Furthermore, in my arrangement the power dividing means is located so that it is readily accessible for repair or placement, and is adapted to be assembled and installed as a compact unit.

While I have illustrated and described my invention in a detailed manner it should be understood, however, that I do not intend to limit myself to the precise details, and arrangements of parts, shown and described, but regard my invention as including such changes and modifications as do not involve a departure from the spirit of the invention and the scope of the appended claims.

Having thus described my invention, I claim:

1. In a motor vehicle the combination of two rear driving axles having the pinion shafts thereof offset on opposite sides of the longitudinal center line of the vehicle and in a substantially horizontally extending plane which is spaced in the vertical direction from the axes of the axle housings, power dividing means mounted on the foremost of said axles for supplying power to the pinion shaft of the foremost axle, and means extending substantially longitudinally of the vehicle and across the housing of the foremost axle in vertically spaced relation with respect to the axis thereof for supplying power from said dividing means to the pinion shaft of the rearmost axle.

2. In a motor vehicle the combination of a pair of rear driving axles, a casing carried by the foremost of said axles, a propeller shaft for transmitting the power supply for said axles, and means for dividing said power supply between said axles comprising differential mechanism in said casing, spaced shafts in said casing, and cooperating gear means associated with said differential mechanism and said spaced shafts, the gear means of said shafts being movable axially thereof.

3. In a motor vehicle the combination of a pair of rear driving axles, a casing carried by the foremost of said axles, a propeller shaft for transmitting the power supply for said axles, and means for dividing said power supply between said axles comprising differential mechanism in said casing, spaced shafts in said casing one being the pinion shaft of the foremost axle, means for axially adjusting said pinion shaft, and cooperating gear means associated with said differential mechanism and said spaced shafts, said pinion shaft and the gear means thereof being relatively movable whereby the latter can locate itself independently of the ajustment of said pinion shaft.

4. In a motor vehicle the combination of a pair of rear driving axles, and power dividing means for said axles comprising a casing, a shaft held in said casing against axial movement, a differential associated with said shaft, a pair of shafts spaced from said differential, means for adjusting one of said shafts in the direction of its axis, and gear means slidable on said shafts and cooperating with said differential.

5. In a motor vehicle the combination of a pair of rear driving axles, and power dividing means for said axles comprising a casing, a shaft held in said casing against axial movement, a differential associated with said shaft, a pair of shafts spaced from said differential, means for adjusting one of said shafts in the direction of its axis, and means for transmitting power to said spaced shafts from said differential including cooperating helical gear means, the gear means of said spaced shafts being slidable thereon.

6. In a motor vehicle the combination of a pair of rear driving axles, and power dividing means for said axles comprising a casing, a shaft held in said casing against axial movement, a differential associated with said shaft, a pinion shaft for one of said axles spaced from the first mentioned shaft, means for adjusting said pinion shaft in the direction of its axis, and gear means slidable on said pinion shaft and cooperating with said differential.

7. In a motor vehicle the combination of a pair of rear driving axles, and power dividing means for said axles comprising a casing, a shaft held in said casing against axial movement, a differential associated with said shaft, a pinion shaft for one of said axles spaced from the first mentioned shaft, means for adjusting said pinion shaft in the direction of its axis, and means for transmitting power to said pinion shaft from said differential including cooperating herring-bone gear means, the gear means of said pinion shaft being slidable thereon.

8. In a motor vehicle the combination of an axle, and means for driving said axle including a plurality of shafts rotatably carried by said axle, one of said shafts being a pinion shaft and another being a power supply shaft, and a herring-bone gear slidably carried by said pinion shaft and in mesh with a herring-bone gear on said power supply shaft.

9. In a motor vehicle driving axle, the combination of a plurality of laterally spaced substantially parallel shafts rotatably carried by said axle, a differential gearing carried on one of said shafts and including a central element operatively connected to said one shaft and an end element rotatably mounted on said one shaft, a herring-bone gear on said end element of said differential gearing, and a herring-bone gear splined on another of said shafts and in mesh with the gear on said end element of said differential gearing.

10. In a motor vehicle the combination of a plurality of tandem driving axles, a shaft carried by the forward one of said tandem axles and adapted to be driven from a source of power, differential gearing carried by said shaft and having one element thereof connected to said shaft, a second shaft carried by the forward axle and spaced laterally from the first mentioned shaft for driving said forward axle, means for driving the second shaft from a second element of said differential gearing, a third shaft carried by the forward axle and spaced laterally from the first mentioned shaft, means for driving the third shaft from a third element of said differential gearing, and a propeller shaft connected to said third shaft for driving the rearward one of said tandem axles.

11. In a motor vehicle the combination of two rear driving axles, a central shaft carried by the foremost of said axles, shafts carried by said forward axle at opposite sides of said central shaft, differential gearing operatively connecting said shafts, one of said second mentioned shafts adapted to drive said forward axle, and means operatively connected to the other of said second mentioned shafts for driving the other axle.

12. In a motor vehicle the combination of a plurality of rear driving axles, a shaft carried by the foremost of said axles and adapted to be driven from a source of power, a second shaft carried by said foremost axle, offset from the center line of said vehicle and operatively connected to the first mentioned shaft for driving the foremost axle, a shaft carried by the rearmost axle offset from the center line of said vehicle on the opposite side from the second mentioned shaft for driving the rearmost axle, and a shaft operatively connected to the first mentioned shaft forward of the foremost axle and to the shaft carried by the rearmost axle, said shaft extending substantially longitudinally of the vehicle and positioned above the foremost axle.

GUSTAV W. CARLSON.